Dec. 27, 1927.  1,654,407

B. BOULOGNE

AUTOMATIC WEIGHING APPARATUS WITH WEIGHING CARRIER

Filed Jan. 13, 1926

Inventor
B. Boulogne
By Marks & Clerk
Attys.

Patented Dec. 27, 1927.

1,654,407

UNITED STATES PATENT OFFICE.

BALTUS BOULOGNE, OF PASURUAN, JAVA, DUTCH EAST INDIES.

AUTOMATIC WEIGHING APPARATUS WITH WEIGHING CARRIER.

Application filed January 13, 1926, Serial No. 81,030, and in the Netherlands October 6, 1924.

The present invention relates to an automatic weighing-apparatus which is, amongst other things suitable for use in sugar-factories in weighing the residue (ampas) left after grinding the cane, which weighing is necessary for an efficient supervision of the plant.

Up to the present time many difficulties were encountered, in using machines with weighing-tanks for weighing ampas, as the material assembled in the weighing-tank flows from said tank with difficulty, the material suddenly pouring from the weighing-tank often causing obstruction and hindrance in running the plant.

The weighing-machine according to the present invention is based upon the principle that instead of the weighing-tank, weighing takes place on a platform, which platform comprises a non-stopping carrier and a second carrier on which, at the moment that weighing of the charge takes place, the oncoming material is temporarily retained the second carrier being arranged above the weighing-carrier. The former carrier, after the charge on the weighing-carrier has been weighed, adds its charge to the next charge coming on the weighing carrier, so that an almost perfectly regular flow of the ampas is obtained.

Above the weighing-carrier a tank or the like may be used just as well for temporarily retaining the onflowing mass during the weighing of the charge.

The driving of the weighing-carrier may be effected either by means of an electromotor or a flexible shaft or by means of a shaft, one end of which is supported by the weighing carrier and the other end by a rigid supporting-point so that this has no influence on the exactitude of the weighing. The weighing-carrier may be either suspended to the scale-beam or may rest on it.

In the annexed drawing Fig. 1 is shown in the position taken up by the machine just after having finished the charging of the weighing-carrier; the material to be weighed being indicated by dots.

Figure 1:
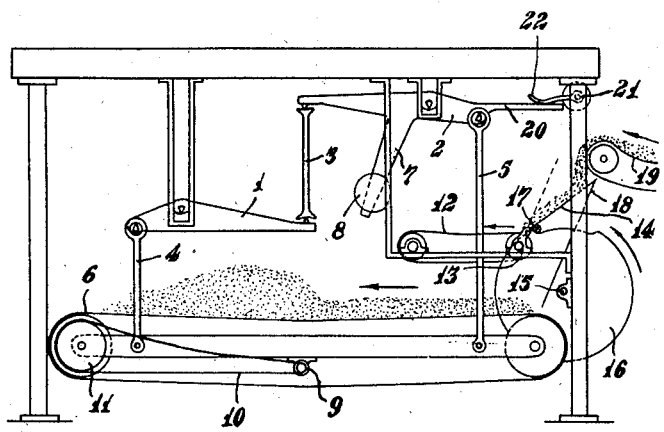
Figure 2:
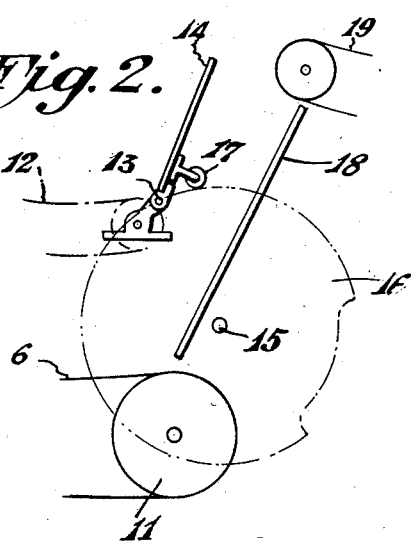
Fig. 2 is a detail of the device showing the means for diverting the material during the weighing operation.
Figure 3:
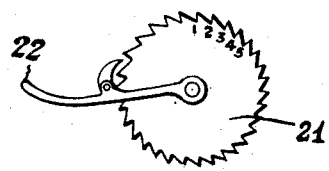
Fig. 3 is a detail showing the recording mechanism.

To the scale-beams 1 and 2, connected to each other by a rod 3, a weighing-carrier 6 is suspended by means of the rods 4 and 5. The scale-beam 2 has an arm 7, carrying a weight 8, so that this weight works on the balance in a sense opposite to that of the carrier suspended to the rods 4 and 5 and to its possible charge.

An electromotor 9 suspended to the weighing-carrier 6, drives this carrier by means of a chain 10 and a chain disc 11.

Above the weighing-carrier a rigid carrier 12 is arranged, above the beginning of which the centre of rotation 13 of a movable sliding-plate 14 is arranged. A disc 16 rotatable around a shaft 15 is provided, which disc is formed such that a roller 17 connected to the sliding-plate 14, during the greater part of the rotation movement of the disc 16 retains the falling-plate in the dotted position, whereas during the other (shorter) part of the rotating movement of this disc 16 the sliding-plate (14) is in the position as shown on the drawing.

In the latter position the sliding-plate 14 rests against another non-movable sliding-plate 18. This plate 18 is arranged below the end of a feeding-carrier 19 which feeds the material to be weighed. The balance 2 has a tail 20. Further the machine is provided with a registering apparatus 21, of which an arm 22 with regard to the position of the tail 20 can make a more or less large movement, causing the numerating-disc of the registering-apparatus to rotate more or less in agreement with the charge present on the weighing-carrier.

The registering apparatus is actuated by the disc 16 in such a way that only after the sliding plate 14 has been brought into the position as shown on the drawing, and after the scale-beams of the weighing-machine have had time to come to a standstill (have rocked out) the registering-apparatus comes into action. The disc 16 is either driven from the feeding-carrier 19 or in any desired manner; at each rotation of this disc a weighing takes place, the length of the recess made in the disc determining the length of the gap arising between the weighing charge and the charge still to be weighed on the weighing-carrier. The disc 16 rotates with regard to the movement of the weighing-carrier in such timed relation that in the time of its rotation, the weighing-carrier has moved about its whole length. The stationary carrier 12 is likewise driven from the feeding-carrier or in any desired manner and runs about half the speed of the weighing-carrier.

The working of the machine is as follows:—

The feeding-carrier 19 normally supplies the material to be weighed, to the weighing-carrier 6, the movable sliding-plate 14 being in the position as shown in the drawing by a dotted line, the material sliding down the plate 18 on to the weighing-carrier. This charging of the weighing-carrier is continued as long as the movable plate is kept in its dotted position by the cam action of the disc 16. As soon as the disc 16 has rotated so far that the roller 17 has an opportunity to drop into the recess on the circumference of this disc, the sliding-plate 14 will move to the right and take up the position as indicated in the drawing, thus resting against the plate 18, causing the charging of the weighing-carrier to cease, and the now on-coming material to be weighed slides on to the carrier 12 arranged above the weighing-carrier. The weighing-carrier running continuously in the direction as indicated by the arrow, has now received a charge, as indicated in the drawing, and when the charging of this carrier ceases the charge just received has not advanced so far as to have reached the end of the weighing-carrier. A preceding charge has just been discharged from the weighing-carrier. Shortly after the charging of the weighing-carrier ceases, the weighing-machine comes to a standstill (the balance has rocked out) and the registering-apparatus 20 is actuated. The members for arresting the balance and for actuating the registering apparatus are not shown in the drawing, as they may be deemed sufficiently known. After the charge on the weighing-carrier has been registered, the roller 17 reaches the end of the recess provided in the disc 16, thus causing the sliding plate 14 to be brought into the dotted position, so that a subsequent charge begins to flow on to the weighing-carrier, the charge just weighed thereon having passed the end of the weighing-carrier, so that the discharge may begin. The weighing-carrier not having been charged during the time in which the movable sliding-plate 14 rests against the sliding-plate 18, a gap occurs at regular intervals between the charge just weighed and that which has still to be weighed. Owing to the slower advancing of the carrier 12 with regard to the weighing-carrier the part of the on-coming material to be weighed, which has been retained on the carrier 12 arranged above the weighing-carrier is poured on to the weighing carrier, after the gap arisen on the weighing-carrier has advanced so far that the material pouring down from the carrier 12 falls down upon the still unweighed material present on the weighing-carrier.

I claim:

1. A weighing apparatus for weighing material in bulk, comprising a continuously moving endless carrier to which the material to be weighed is delivered, a frame, a plurality of levers suspended from said frame, suspension rods for suspending said carrier from said levers, a registering device associated with said levers, means for delivering material to said carrier, a second moving endless carrier mounted directly above said first carrier, and means for diverting the flow of material from said first carrier during a portion of its travel and depositing the material on said second carrier.

2. A weighing apparatus as claimed in claim 1, said second carrier being adapted to hold said material while the weight of the material is registered and deliver the material to said first carrier after a predetermined travel of the first carrier.

3. In combination two simultaneously operated means for conveying material, one of which conveys the material to the other, a frame, means on said frame for counterbalancing the latter conveying means whereby the weight of the material conveyed can be determined, a material receiving means and means operated by one of said conveying means to divert the material conveyed by the first conveying means to the material receiving means during the weighing operation.

4. In combination two simultaneously operated means for conveying material, one of which conveys the material to the other, a frame, means on said frame for counterbalancing the latter conveying means whereby the weight of the material conveyed can be determined, a material receiving means, means operated by one of said conveying means to divert the material conveyed by the first conveying means to the material receiving means during the weighing operation, and means adapted to move the material on said material receiving means subsequently to the weighing conveyor.

5. In combination two simultaneously operated means for conveying material, one of which conveys the material to the other, a frame, means for counterbalancing the latter conveying means on said frame whereby the weight of the material conveyed can be determined, a third conveyor and means operated by one of said conveying means to divert the material conveyed by the first conveying means to the third conveyor during weighing operation, and means to operate said third conveyor to deliver the material to second conveying means after a predetermined travel of the second conveying means.

6. In combination, two simultaneously operated means for conveying material, one of which conveys the material to the other, a frame, means on the frame for counterbalancing the latter conveying means, whereby the weight of the material conveyed can be determined, a material receiving means and means operated by one of said conveying means to divert the material conveyed by the first conveying means thereto during the weighing operation, said means also operating after a period of time to permit the material conveyed thereto by the first conveying means to be discharged on the second conveying means.

In testimony whereof I affix my signature.

BALTUS BOULOGNE.